United States Patent [19]

Sato

[11] Patent Number: 5,442,149

[45] Date of Patent: Aug. 15, 1995

[54] SWITCH APPARATUS FOR AUTOMOBILE

[75] Inventor: Hiroshi Sato, Tokyo, Japan

[73] Assignee: Toyo Denso Kabushiki Kaisha, Tokyo, Japan

[21] Appl. No.: 144,484

[22] Filed: Oct. 29, 1993

Related U.S. Application Data

[63] Continuation of Ser. No. 777,082, Oct. 16, 1991, abandoned.

[30] Foreign Application Priority Data

Oct. 17, 1990 [JP] Japan .................. 2-108752 U
Nov. 7, 1990 [JP] Japan .................. 2-116746 U

[51] Int. Cl.$^6$ .................................................. H01H 9/00
[52] U.S. Cl. ............................. 200/5 R; 200/293
[58] Field of Search ........... 200/5 R, 5 C, 5 E, 17 R, 200/18, 529, 293, 303

[56] References Cited

U.S. PATENT DOCUMENTS

| | | | |
|---|---|---|---|
| 3,254,163 | 5/1966 | Wanlass | 200/6 |
| 3,283,111 | 11/1966 | Wirsching | 200/168 |
| 4,473,724 | 9/1984 | Suzuki | 200/5 R |
| 4,695,682 | 9/1987 | Winogrocki | 200/5 R |
| 4,742,186 | 5/1988 | Miura | 200/5 E |
| 5,128,500 | 7/1992 | Hirschfeld | 200/5 R |
| 5,149,924 | 9/1992 | Priesmuth | 200/5 R |

FOREIGN PATENT DOCUMENTS

| | | | |
|---|---|---|---|
| 1-17057 | 5/1969 | Japan | H01H 15/02 |
| 2-24183 | 7/1990 | Japan | H01H 25/02 |

Primary Examiner—Marc S. Hoff
Assistant Examiner—Michael A. Friedhofer

[57] ABSTRACT

In a switch apparatus for an automobile having a pair of right-hand switch units and left-hand switch units to be arranged vis-à-vis in a driving compartment of an automobile, a commonly available casing for each of the switch units comprises a pair of housings symmetrically arranged to each other with respect to the central axis thereof in order to accommodate therein switch component parts. One of the housings is provided for the right-hand switch unit and the other is for the left-hand switch unit, whereby resulting in a decrease of component parts and a diminution of the die cost.

12 Claims, 9 Drawing Sheets

SWITCH APPARATUS FOR AUTOMOBILE

This application is a continuation of application Ser. No. 07/777,082 filed on Oct. 16, 1991, now abandoned.

BACKGROUND OF THE INVENTION

1. Field of the Invention

The present invention relates to a switch apparatus for an automobile, and more particularly to a pair of switch units to be oppositely arranged vis-à-vis to each other, for example, within a driving compartment of the automobile.

2. Description of the Background Art

In a switch apparatus for an automobile, there is known a pair of a right-hand and a left-hand switch units arranged opposite to each other inside of an automobile. With respect to such pair of the switch units, however, it is necessary to manufacture in a symmetrical shape two kinds of casings or other component parts for the respective right-hand and left-hand switch units in order to permit a symmetrical arrangement and movement of component parts, even if they have the same function. Thus, the known switch apparatus as afore-mentioned requires more component parts, thereby resulting in an increase in not only a die cost but also a production cost.

SUMMARY OF THE INVENTION

Therefore, the present invention is made in view of the afore-mentioned disadvantage of the prior art and an object of the invention is to provide an improved switch apparatus for an automobile possible to utilize in common a casing and other component parts for a pair of a right-hand and a left-hand switch units.

To this end, according to the present invention, there is provided a switch apparatus for an automobile having a pair of a right-hand and a left-hand switch units to be arranged opposite to each other inside the automobile, wherein each of the switch units comprises a casing, switch component means with an electric contact therein, and a pair of depressed compartments being provided on the casing for accommodating therein the switch component means, the pair of the depressed compartments symmetrically positioned with reference to a central axis of the casing, one of the depressed compartments adapted to be utilized for the right-hand switch unit and the other of the depressed compartments adapted to be utilized for the left-hand switch unit.

According to this invention, there is also provided a switch apparatus for an automobile having a pair of a right-hand and a left-hand switch units to be arranged opposite to each other inside the automobile, wherein each of the switch units comprises a casing, a lid mounted on the casing, a first switch including first switch component means with an electric contact therein and first switch operating means operatively connected to the switch component means, and a second switch including second switch component means with an electric contact therein and second switch operating means operatively connected to the second switch component means, the first and second operating means being projected outside through the lid, the casing having first depressed compartments for accommodating therein the first switch component means and a pair of the second depressed compartments for accommodating the second switch component means, the pair of the second depressed compartments being positioned symmetrical with reference to the central axis of the casing, and the second switch component means adapted to be selectively arranged in either one of the second depressed compartments.

In one preferred form of the present invention, each of the switch units further comprises a link for operatively engaging the first and the second switch operating means, and the lid adapted to slidably carry the link on the external surface thereof so that the link may be easily and accurately assembled in connection with the first and second switch operating means by being inspected from outside.

The above and other objects, features and advantages of the present invention will appear more fully hereinafter from a consideration of the following description taken in connection with the accompanying drawings wherein an example is illustrated by way of example.

DETAILED DESCRIPTION OF THE PREFERRED EMBODIMENT

Figure 10:
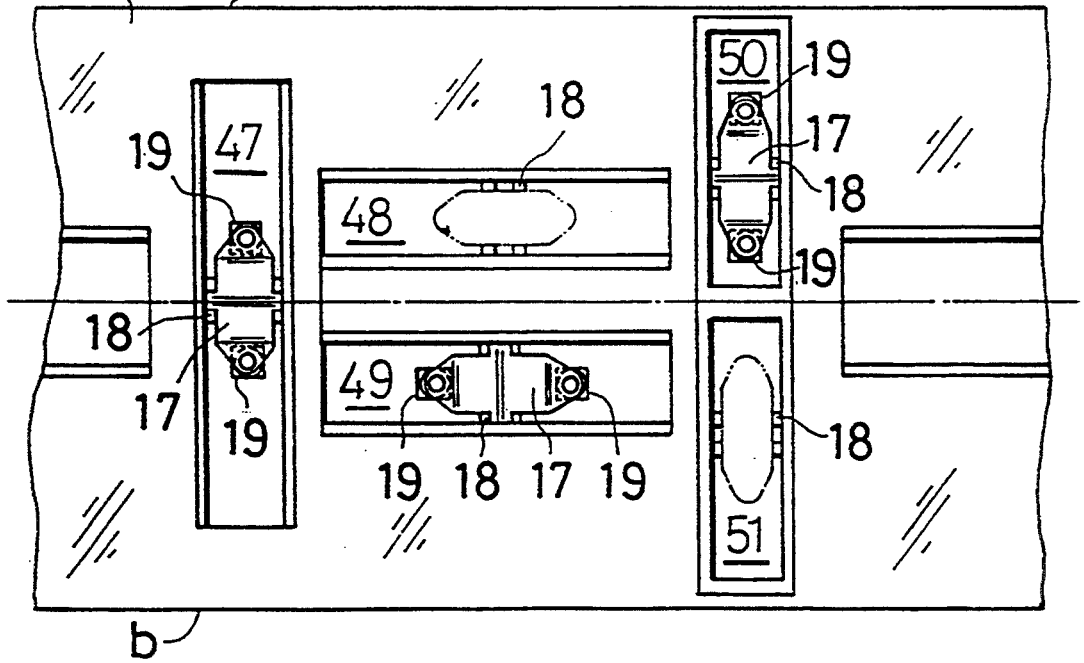
FIG. 10 is a plan view of an essential part of the right-hand switch unit.
Figure 11:
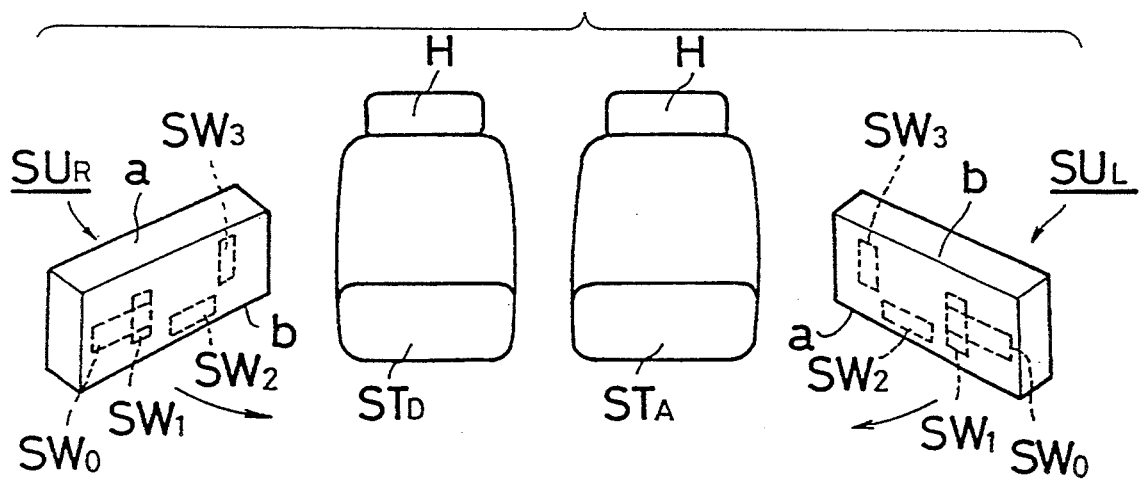
FIG. 11 is a schematically explanatory view showing the inside of a driving compartment of an automobile.

Referring now to FIGS. 1 to 14, wherein like reference numerals designate like or corresponding parts throughout, there is illustrated a switch apparatus for an automobile as an embodiment of the present invention. As schematically shown in FIG. 11, the switch apparatus for an automobile comprises a pair of a right-hand switch unit $SU_R$ adapted to be mounted on the side of a driver's seat $ST_D$ and a left-hand switch unit $SU_L$ adapted to be mounted on the side of a passenger's seat $ST_A$. The pair of the switch units $SU_R$ and $SU_L$ are located in an opposed relation in an operative environment within a driving compartment. On each of the switch units $SU_R$ and $SU_L$ are symmetrically arranged in a mirror image relationship a seat switch $SW_0$, a reclining switch $SW_2$ and a headrest switch $SW_3$. The seat switch $SW_0$ is formed of a compound switch for operatively controlling a motor (not shown) in order to selectively adjust a forward and backward sliding position of a seat and upward and downward positions of the front and the rear of the seat, wherein a switch for adjusting the rear of the seat in a vertical direction is designated as a seat elevation switch $SW_1$. Similarly, the reclining switch $SW_2$ and the headrest switch $SW_3$ are provided to operate motors respectively so as to adjustably control a tilting movement (reclining angle) of a back of the seat and an up and down movement of a headrest H. In FIG. 11, the switch units $SU_R$ and $SU_L$ are illustrated in an enlarged scale.

Figure 1:
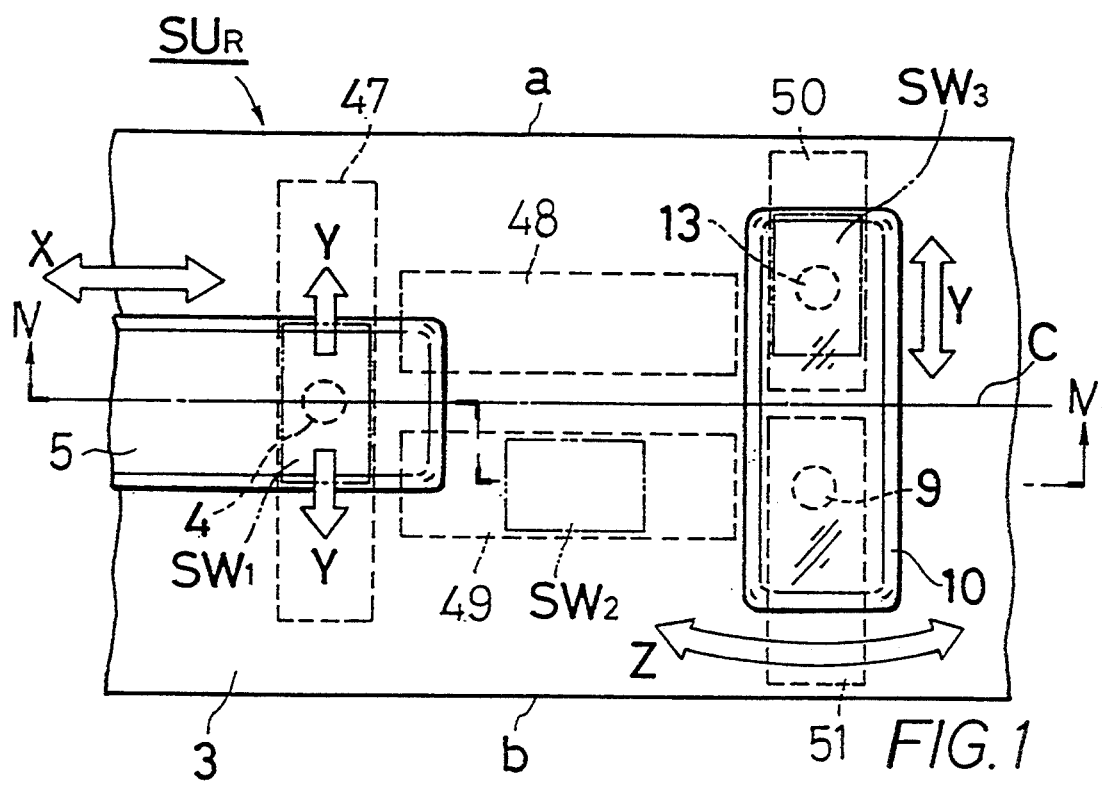
FIG. 1 is a plan view of an .essential part of the switch apparatus according to the present invention, showing a right-hand switch unit.
Figure 2:
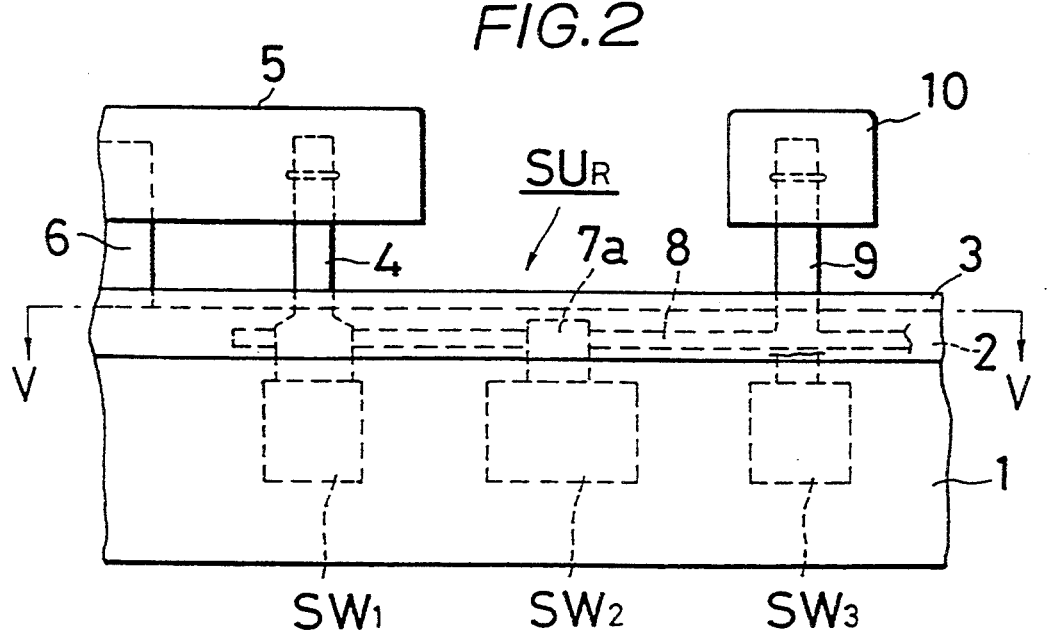
FIG. 2 is a side view of an essential part of the right-hand switch unit.
Figure 3:
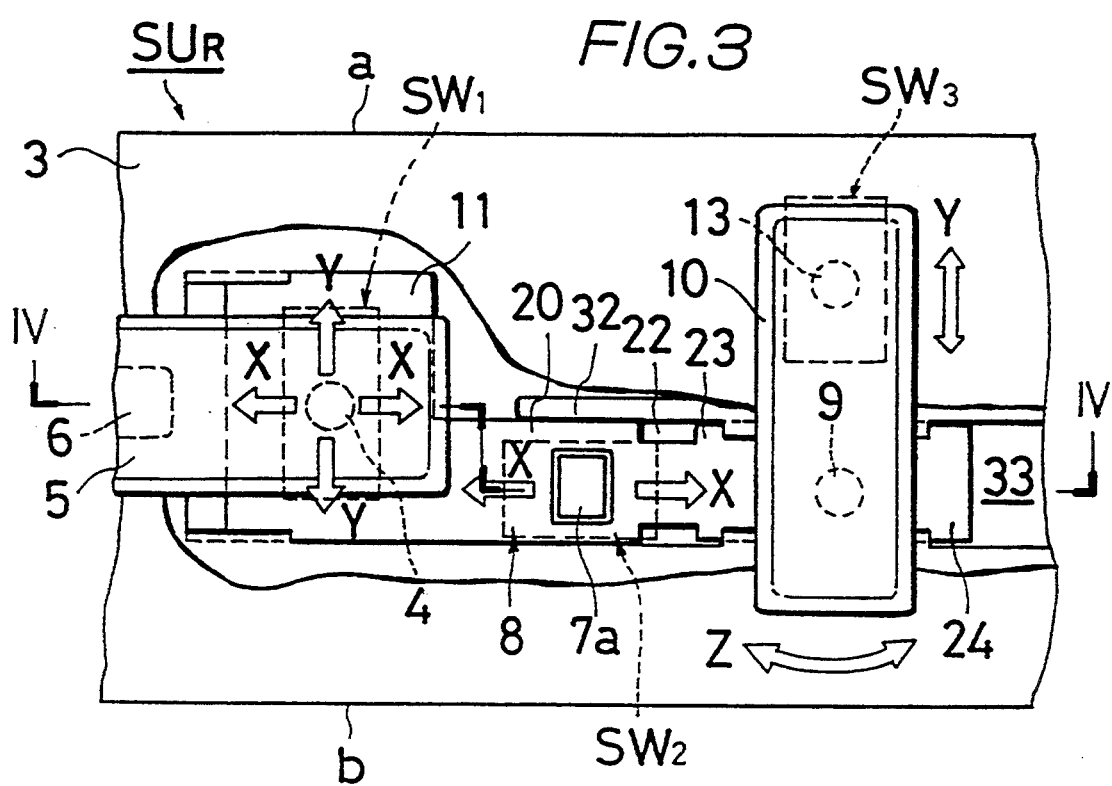
FIG. 3 is a partially cutaway plan view of an essential part of the right-hand switch unit.

As roughly illustrated in FIG. 2, the seat elevation switch $SW_1$, the reclining switch $SW_2$ and the headrest switch $SW_3$ are accommodated within a casing 1 respectively and covered with a lid 2 and a resilient cover 3. Thus, with the casing 1 and the lid 2 is formed a closed housing for these switches. An operation rod 4 of the seat, elevation switch $SW_1$ is projected upwards through the lid 2 and the cover 3 and engaged with a switch knob 5. The knob 5 is guided by a guide 6 which is integrally protruded upwards from the lid 2 and, as shown in FIGS. 1 and 3, linearly movable in a left forward and right backward direction of an arrow "X" (hereinafter, referred to as "X direction") and in an upward (toward upper side "a" in the drawing) and downward (toward a lower side "b") direction of an arrow Y (hereinafter, referred to as "Y direction"). The operation rod 4 is permitted to move only in the Y direction. As apparent from FIG. 4, the operation rod 4 is engaged at the top thereof to an oblong recess 5a of the knob 5 which extends along the X direction, whereby allowing the knob 5 to move in the X direction with relation to the operation rod 4 in such a state that a tip end 4a of the rod 4 is in engagement with a concave portion 5b of the knob 5.

Figure 4:
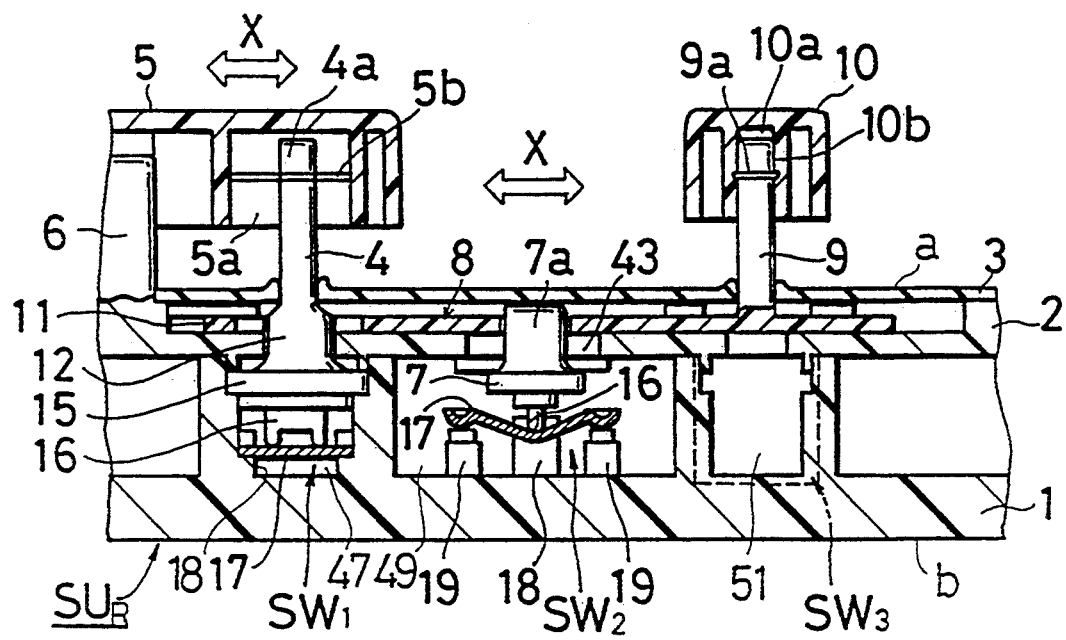
FIG. 4 is a sectional view taken along line IV—IV of FIGS. 1 and 3.
Figure 5:
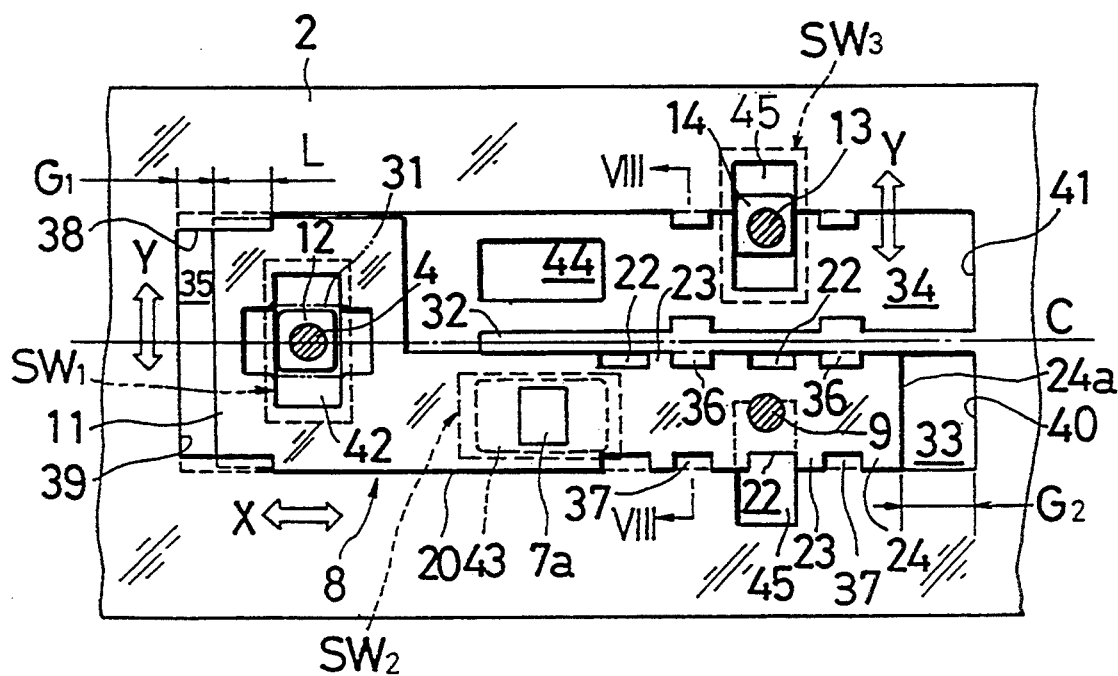
FIG. 5 is a sectional view taken along line V—V of FIG. 2.

Referring now to FIGS. 4 and 5, the reclining switch $SW_2$ has a slider 7 the head 7a of which is engaged with a link 8, so that the reclining switch $SW_2$ may be operated through the movement of the link 8 in the X direction. An operation rod 9 is integrally projected from an end of the link 8 and engaged at the top thereof with an oblong recess 10a which is commonly used for the reclining switch $SW_2$ and the headrest switch $SW_3$. The oblong recess 10a is formed substantially at a right angle to the oblong recess 5a and extends along the direction of an arrow Y. Therefore, the knob 10 may be moved in the Y direction irrespective of the existence of the operation rod 9. Numeral 9a designates a protruding portion of the operation rod 9 to be in engagement to a concave portion 10b of the knob 10.

Figure 6:
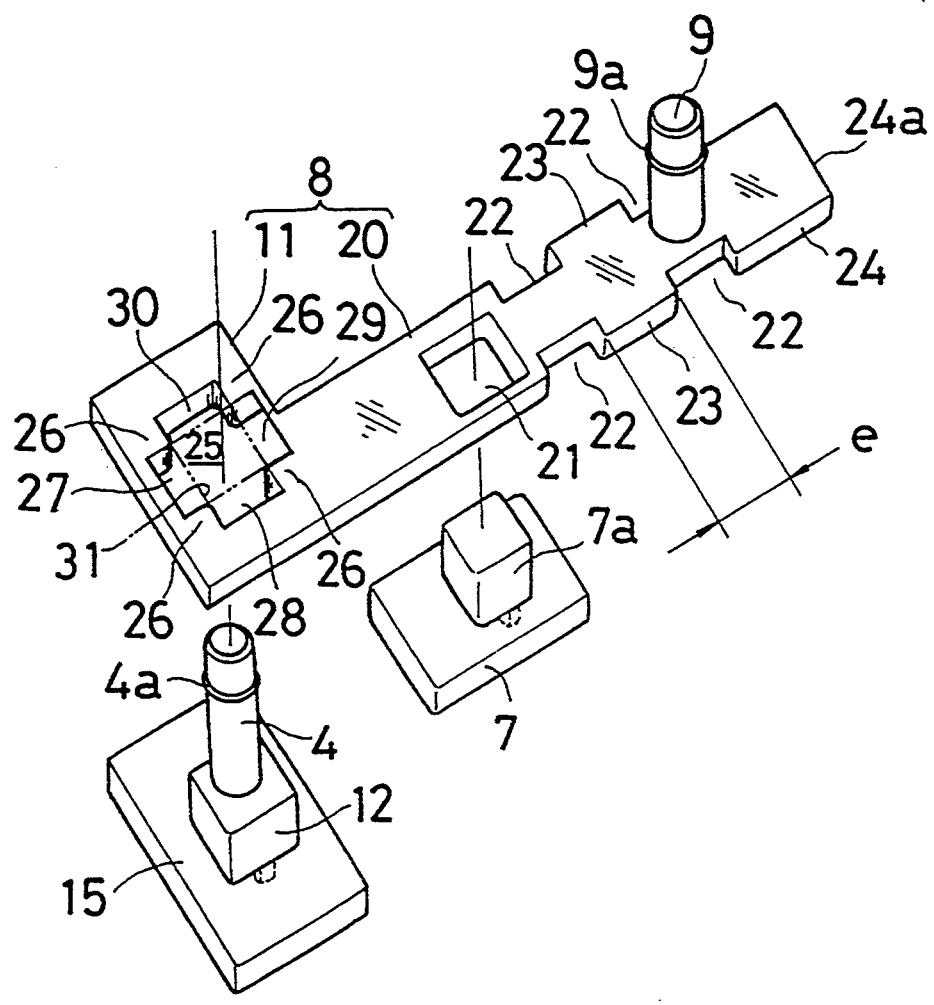
FIG. 6 is an exploded perspective view showing a relationship of a link with an operation rod and a slider.

As will be understood from FIGS. 5 and 6, when the link 8 moves in the X direction together with the operation rod 9, a lock portion formed on the forward end of the link 8 comes into engagement with a square base 12 of the operation rod 4 thereby to prohibit the operation rod 4 from moving in the Y direction so that the concurrent use of the reclining switch $SW_2$ and the seat elevation switch $SW_1$ may be prevented.

As shown in FIGS. 1 and 5, an operation rod 13 of the headrest switch $SW_3$ is engaged with the knob 10 at the side opposite to the operation rod 9. In FIG. 5, numeral 14 designates a base of the operation rod 13. The operation rod 13 moves along the direction of an arrow Y in cooperation with the movement in the Y direction of the knob 10 and functions as a pivot of rotation when the knob 10 swings at the side of the operation rod 9 along the direction of an arrow "Z" in FIG. 1 (hereinafter, referred to as "Z direction"). Therefore, when the knob 10 is operated in the Y direction, only the operation rod 13 moves up and down to actuate the headrest switch $SW_3$ thereby adjustably controlling the up and down movement of the headrest H. When the knob 10 swings in the Z direction, the operation rod 9 moves in the X direction and causes the link 8 to move in the X direction so that the reclining switch $SW_2$ is actuated to adjust the reclining angle.

The operation rods 4, 9 and 13, the link 8 and the slider 7 serve as a part of contact operation means. The detailed construction of each switch is shown in FIGS. 4 and 10, wherein spring biased pushers 16 project from the lower end of the slider 7 of the reclining switch $SW_2$ and on the lower end of a slider 15 which is formed integral with the base 12 of the seat elevation switch $SW_1$. The pushers 16 are slidably arranged on substantially V-shaped swing plates 17. Each swing plate 17 is supported at the center thereof on each of steps 18 and adapted to be tilted either side by each of the pusher 16 so as to selectively turn on or off respective micro-switches 19 which are positioned on the opposite ends of the swing plate 17. Each of the micro-switches 19 is provided therein with an electric contact and serves as mechanical component parts of the present invention in cooperation with the swing plate 17 and the slider 7 or 12. The construction of the switch is not limited to this specific embodiment and there may be utilized various types of the conventional switches. The swing plate 17 itself may be utilized as a movable contact when the micro-switches 19 function as a fixed contact.

As clearly shown in FIG. 6, the link 8 is formed of a substantially L-shaped configuration and includes the lock portion 11 and an arm portion 20 which extends perpendicular to the lock portion 11. At the middle of the arm portion 20 is formed an engaging aperture 21 to which the head 7a of the slider 7 is engaged. The rear part of the arm portion 20 is symmetrically and alternately provided on both sides thereof with concave portions 22 and convex portions 23. The rear end 24 of the arm portion 20 is protruded to the opposite sides thereof at the same level as the convex portions 23.

The lock portion 11 has an engaging aperture 25 of a cross shape through which the base 12 of the operation rod 4 extends to be engaged therewith. From each corner of the engaging aperture 25, shoulder portions 26 project inwardly of the engaging aperture 25. Between the neighboring shoulder portions 26, lock grooves 27, 28, 29 and 30 are formed to be engaged with the base 12. When the reclining switch $SW_2$ is in the neutral position of FIG. 5, the base 12 is positioned within a neutral space 31 defined by four apexes of the shoulder portions 26 and remains free from engagement with each of the lock grooves 27 through 30. The lock grooves 27 and 29 are brought into engagement with the base 12 upon operation of the reclining switch $SW_2$ so as to prevent the operation rod 4 from moving in the Y direction. The lock grooves 28 and 30 allow the operation rod 4 to move in the Y direction when the base is in the neutral space 31.

Figure 14:
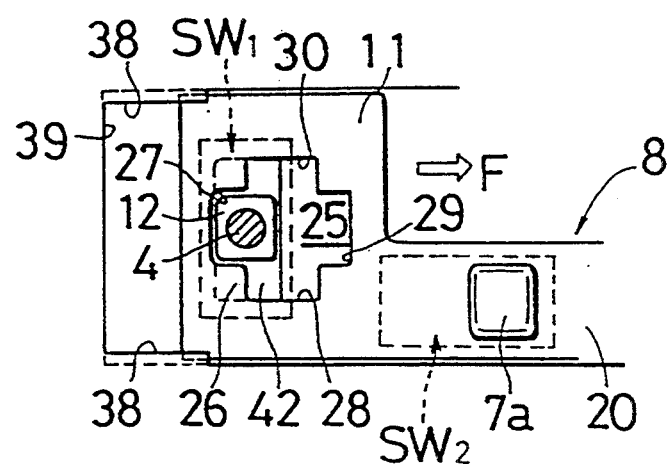

When operating the reclining switch $SW_2$ in the Z direction of FIG. 1 from the neutral position of each switch shown in FIG. 5 the knob 10 rotates around the operation rod 13 as a pivot whereby causing the operation rod 9 and the link 8 to move in the X direction. As shown in FIG. 14 the base 12 comes into engagement with the lock groove 27 by the rearward movement (in the direction of an arrow "F") of the link 8. Similarly, the movement of the link 8 in the reverse direction causes the base to be engaged with the lock groove 29 so as to prevent the concurrent use of the seat elevation switch $SW_1$ during the operative condition of the reclining switch $SW_2$.

Figure 7:
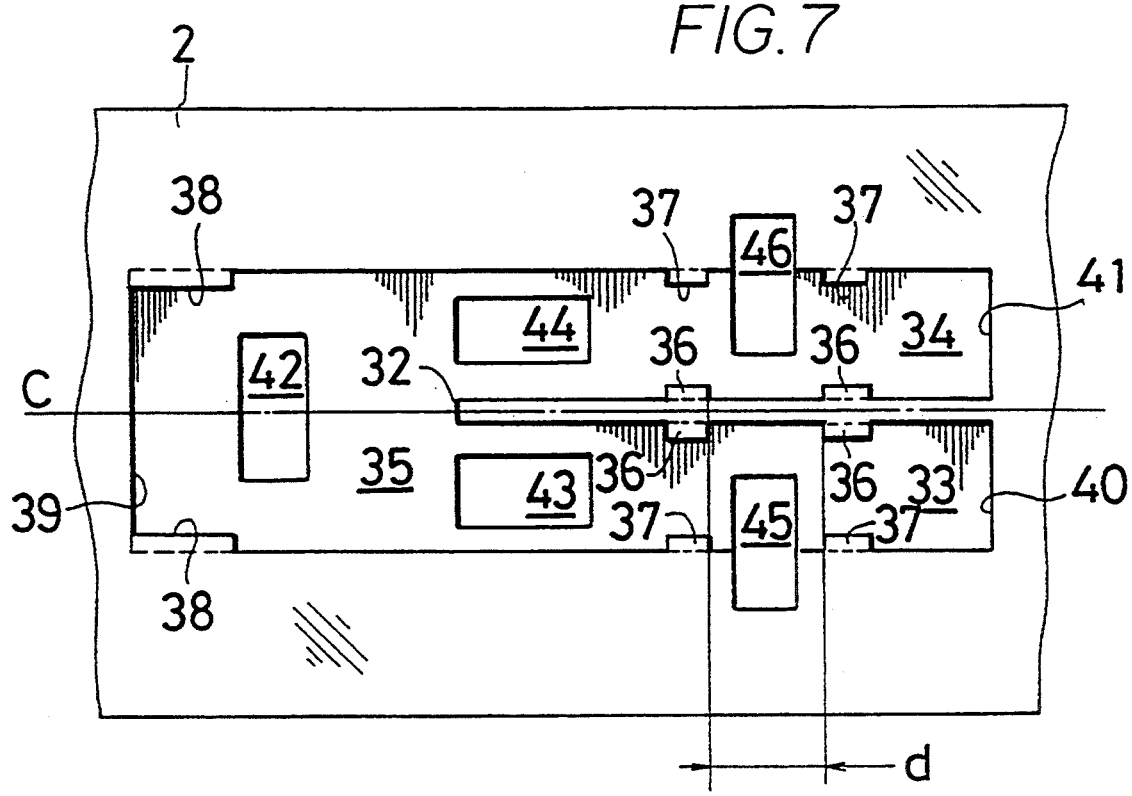
FIG. 7 is a plan view showing a link mounting portion of a lid.
Figure 8:
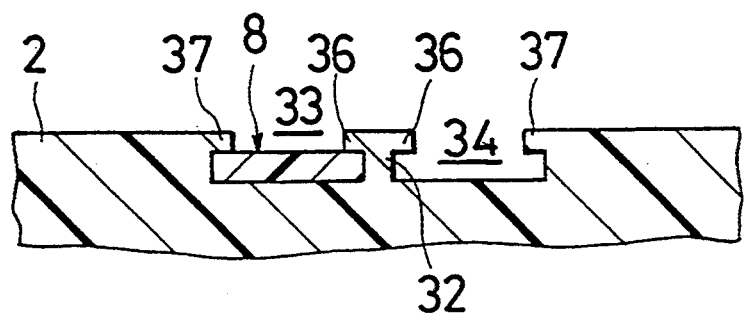
FIG. 8 is a sectional view taken along line VII—VII of FIG. 5.
Figure 9:
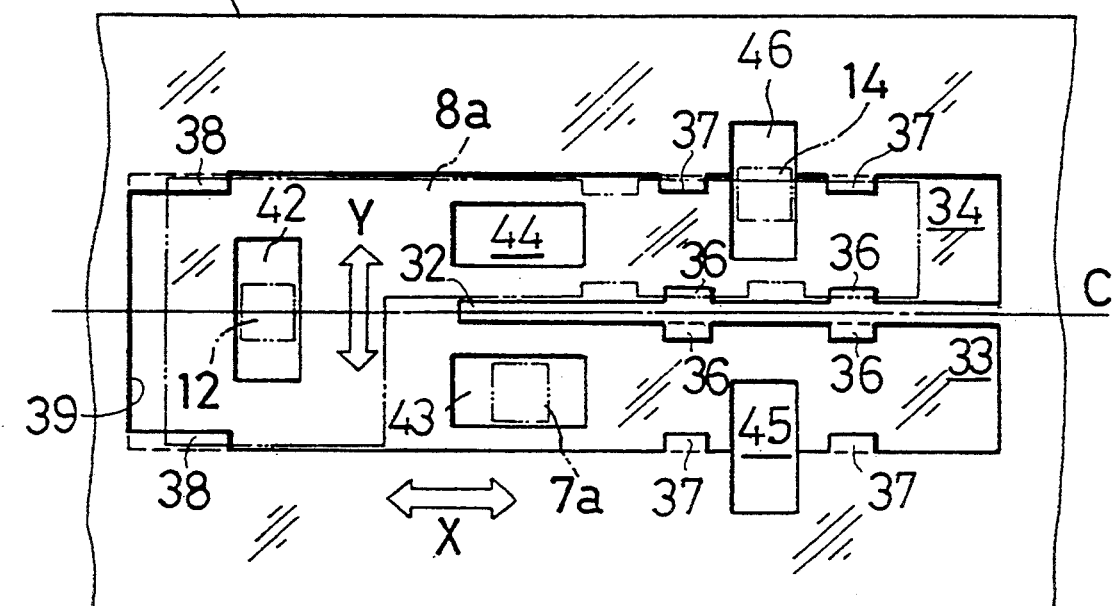
FIG. 9 is a plan view similar to FIG. 7.

Referring now to FIGS. 7 to 9, FIG. 7 is a partial plan view of the lid 2, showing a mounting area of the link 8. The link mounting area is formed with a recess which is deep enough to accommodate therein the link 8 of substantially a flat configuration. An area for accommodating the arm portion 20 comprises recesses 33 and 34 being formed symmetrical with respect to a longitudinally extending partition wall 32. An area for accommodating the lock portion 11 is formed with a recess 35 extending transversely From the lower edge of the recess 33 to the upper edge of the recess 34 at the terminating end of the partition wall 32. Four pairs of support rims, each pair designated by 36 and 37, project in an opposed relationship from both sides of the partition wall 32 and from each outer edge of the recesses 33 and. 34. The support rims 36 and 37 are capable of engaging the upper surface of the link 8. Each of spans "d" between the neighboring support rims 37 and 37 as well as 36 and 36 corresponds in size substantially to the length "L" in FIG. 5 of the convex portions 23 of the link 8. A pair of support rims 38 and 38 similar to the rims 36 and 37 are provided on the opposite sides of the front end of the recess 35. As shown in FIG. 8, the rims 36 and 37 overlap the upper surface of the link 8 and prevent the link 8 from getting out of place. As is apparent from FIG. 5, in the neutral position of the reclining switch $SW_2$ a clearance $G_1$ corresponding to a switching stroke is formed between the front end of the lock portion 11 and a stopper end 39 of the recess 35. The front end of the lock portion 11 is engaged at the opposite sides thereof with the rims 38 and 38 to such an extent as substantially corresponding to a dimension "L". A clearance $G_2$ larger than the dimension "L" is formed between a rear edge 24a of the link 8 and a stopper edge 40 of the recess 33, thereby permitting the link 8 to move backwards more than the dimension "L" within the recess 33.

FIGS. 7 and 9 show a plan view of the lid 2, wherein a rectangular opening 42 is formed along the Y direction crossing a longitudinal axis "C" so as to have the base 12 of the operation rod 4 engaged therewith. Rectangular openings 43 and 44 are symmetrically formed at the opposite sides of the longitudinal axis "C" arid extend in the Y direction so as to have the head 7a of the slider 7 engaged therewith. Also rectangular openings 45 and 46 extend along the Y direction in a symmetrical relationship with reference to the longitudinal axis "C" to have the base 14 of the operation rod 13 engaged therewith. The rectangular openings 43 and 46 are utilized for the right-hand switch unit $SU_R$ and the openings 44 and 45 are for the left-hand switch unit $SU_L$. As illustrated by an imaginary dotted line, a link 8a for the left-hand switch unit $SU_L$ is formed of a symmetrical shape to the link 8 of the right-hand switch unit $SU_R$ and adapted to be arranged in such a position as symmetrical to the link 8 with reference to the axis "C".

Figure 13:
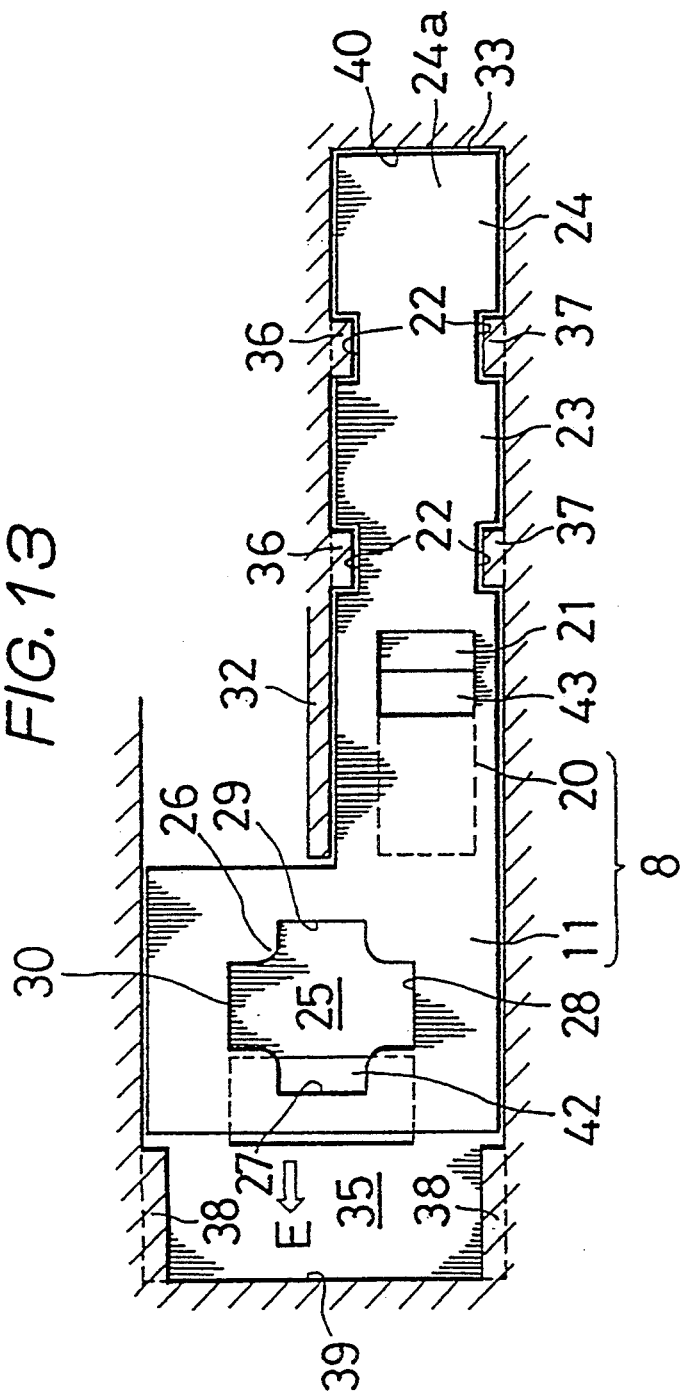
FIGS. 13 and 14 are plan views, each for explaining an operation of the essential part of the switch apparatus.

When explaining the mounting operation of the link 8 on the lid 2, the link 8 is entered into the recesses 33 and 35 in such a way that the rear edge 24a of the link 8 is positioned close to the stopper edge 40 of the recess 33 as seen in FIG. 13. The support rims 36 and 37 are positioned in alignment with the concave portions 22 of the arm port,on 20, while the front end of the lock portion 11 is not yet in an engagement with the support rims 38 and 38. When the link 8 is moved forwards to the neutral position thereof in a direction of an arrow "E", the convex portions 23, the rear end 24 and the lock portion 11 of the link 8 are brought at each front end thereof into engagement with the respective support rims 36, 37 and 38. At this stage, the engaging aperture 21 of the arm portion 20 and the neutral space 31 of the engaging aperture 25 on the lock portion 11 are vertically registered with each center of the rectangular openings 43 and 42. When the link installed lid 2 is placed on the casing 1 which accommodates therein the switch component parts in advance, the closed space is defined inside, and as seen from FIG. 5, the operation rod 4 and the base 12 are entered into the neutral space 31 of the engaging aperture 25. At the same time, the head 7a of the slider 7 is inserted into the engaging aperture 21. The operation rod 13 and the base 14 are inserted into the rectangular opening 46. In this condition, since the movement of the link 8 is limited by the base 12 and the front end of the lock portion 11 is not disengaged from the support rims 38 and 38 , the link 8 is held on the lid 2 without getting out of the place. The state of engagement between the lock portion 11 and the base 12 is possible to be inspected from outside at this stage. The resilient cover 3 and the knobs 5 and 10 thereafter are mounted respectively on the predetermined positions and then the mounting operation will be completed.

Due to the construction described above, an assembling in an incomplete mounting condition of the link 8 is possible to be prevented so that the assembling operation may be easily and accurately performed. Since the link 8 is accommodated in the recesses 33 and 35 of the lid 2 and slidably carried thereon, a specific cover member for the link 8, which will be necessary for the conventional switch apparatus, is not required, whereby avoiding the increase of component parts.

FIG. 10 shows a plan view of the casing 1 in which depressed compartments 47 through 51 are formed at the positions corresponding to the rectangular openings 42 through 46 of the lid 2. Each of these compartments 47 through 51 serves as a housing for mechanical component parts of a switch, wherein the depressed compartment 47 corresponds to the rectangular opening 42 and accommodates therein such mechanical component parts as the swing plate 17, the micro-switches 19 and the slider 15. The depressed compartments 49 and 50 corresponding to the rectangular openings 43 and 46 are utilized for the right-hand switch unit $SU_R$ and accommodate therein the similar mechanical parts, respectively. The depressed compartments 48 and 51 which correspond to the openings 44 and 45 are provided for the left-hand switch unit $SU_L$ so as not to accommodate therein any mechanical component parts in view of an unemployed state.

Figure 12:
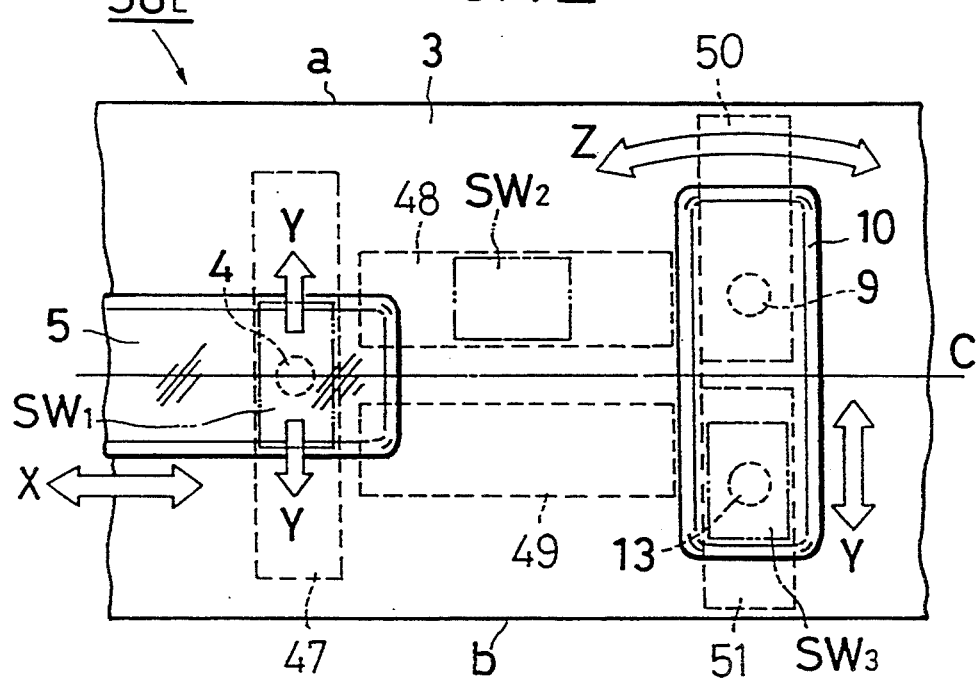
FIG. 12 is a plan view of an essential part of the switch apparatus, showing a left-hand switch unit.

An assembling operation of this embodiment will be explained hereunder with respect to the left-hand switch unit $SW_L$ in lieu of the right-hand switch unit $SU_R$ as explained hereinbefore. At first, the switch component parts for the reclining switch $SW_2$ and the headrest switch $SW_3$ are arranged into the depressed compartments 48 and 51 in FIG. 10. When the lid 2 having the link 8a installed therein in advance is placed on the casing 1, each base 12 and 14 of the operation rods 4 and 13 and the head 7a of the slider 7 are brought into engagement with the rectangular openings 42, 45 and 44 respectively. Also, the base 12 is engaged to the engaging aperture 25 of the lock portion 11 of the link 8a and the head 7a is engaged to an engaging aperture which is provided at the middle of the link 8a. Then, the knobs 5 and 10 are mounted on the respective operation rods 4 and 9, whereby the left switch unit $SU_L$ as shown in FIG. 12 is constituted. In this case, the depressed compartments 49 and 50 are in a non-used condition so as to remain vacant. In comparison with between the left-hand switch unit $SU_L$ in FIG. 12 and the right-hand switch unit $SU_R$ in FIG. 1, the reclining switches $SW_2$ and the headrest switches $SW_3$ are positioned vis-à-vis in a reversed side with respect to the longitudinal axis "C". When the left switch unit $SU_L$ is arranged the upper side thereof down on the side of the passenger's seat $ST_A$ as illustrated in FIG. 11, it is positioned face to face with the right-hand switch unit $SU_R$ in such a state that the arrangement and the operative direction of the respective switches are the same like a mirror image as those of the right-hand switch unit $SU_R$. Therefore, the casing 1 and the lid 2 may be commonly utilized for the left-hand switch unit $SU_L$ as well as the right-hand switch unit $SU_R$, whereby resulting in a decrease of the component parts and a diminution of a die cost. The switch units $SU_R$ and $SU_L$ are utilized upside down with reference to the longitudinal axis "C" thereof in this embodiment. However, if they are formed symmetrical with respect to the transverse axis thereof, the same effect will be performed by reversing the front side thereof rearwards with reference to the intervening transverse axis thereof.

It is to be understood that the form of the present invention herein shown and described is to be taken as a preferred example of the same and that various changes in the shape, size and arrangement of parts may be resorted to without departing from the spirit of this invention or the scope of the subjoined claims.

What is claimed is:

1. A combination of a casing and switch components for use as a right-hand and a left-hand switch unit arranged on opposite sides within an interior of the automobile comprising:
    a casing having a width dimension and a length dimension, said length dimension having a central axis, said casing being substantially symmetrically shaped relative to said central axis for selective use as a right-hand switch and a left-hand switch;
    a first aperture disposed substantially centrally along the length of said casing, said first aperture having a longitudinal length being longer relative to a width dimension with the longitudinal length extending along the length dimension of said casing and being positioned on a first side of said central axis;
    a second aperture disposed substantially centrally along the length of said casing, said second aperture having a longitudinal length being longer relative to a width dimension with the longitudinal length extending along the length dimension of said casing and being positioned on a second side of said central axis, said second aperture being substantially the same shape as said first aperture, said first and second apertures being arranged substantially symmetrically relative to said central axis;
    a third aperture disposed adjacent to and on a first side of said first and second apertures, said third aperture extending along the width dimension and intersecting and extending substantially symmetrically across said central axis, said third aperture having a length being longer relative to a width dimension with the length being arranged to be substantially perpendicular to said central axis;
    a fourth aperture disposed adjacent to and on a second side of said first and second apertures, said fourth aperture extending along the width dimension and being disposed on said first side of said central axis, said fourth aperture having a length being longer relative to a width dimension with the length being arranged to be substantially perpendicular to said central axis;
    a fifth aperture disposed adjacent to and on a second side of said first and second apertures, said fifth aperture extending along the width dimension, being aligned with said fourth aperture and being disposed on said second side of said central axis, said fifth aperture having a length being longer relative to a width dimension with the length being arranged to be substantially perpendicular to said central axis said fifth aperture being substantially the same shape as said fourth aperture, said fourth and fifth apertures being arranged substantially symmetrically relative to said central axis; and
    switch component means being arranged only within said first, third and fifth apertures to function as a left-hand switch unit for the left-hand side of the interior of the automobile and only within said second, third and fourth apertures to function as a right-hand switch unit for the right-hand side of the interior of the automobile, said switch components being selectively operated in said first and second apertures to be actuated in a longitudinal direction and being selectively operated in said third, fourth and fifth apertures in a transverse direction relative to said central axis.

2. The switch apparatus according to claim 1, and further including an elastic cover adapted to fit on said casing for selectively covering substantially the entire switch apparatus while operation means for said switch component means arranged in said first, third and fifth apertures project from said cover when said switch apparatus functions as a left-hand switch unit.

3. The switch apparatus according to claim 1, and further including an elastic cover adapted to fit on said casing for selectively covering substantially the entire switch apparatus while operation means for said switch component means arranged in said second, third and fourth apertures project from said cover when said switch apparatus functions as a right-hand switch unit.

4. The switch apparatus according to claim 1, and further including a link adapted to lock the actuation of the switch component means disposed within said third aperture in the longitudinal direction by the operation of switch component means disposed within said first aperture in the traverse direction relative to the central axis and to lock the actuation of the switch component means disposed within said first aperture in the traverse direction relative to the central axis by the operation of switch component means disposed within said third aperture in the longitudinal direction when said switch apparatus functions as the left-hand switch.

5. The switch apparatus according to claim 4, wherein said link has a predetermined L-shape for engaging, in a first orientation, the switch component means in said third aperture and said switch component means in said second aperture.

6. The switch apparatus according to claim 1, and further including a link adapted to lock the actuation of the switch component means disposed within said third aperture in the longitudinal direction by the operation of switch component means disposed within said second aperture in the traverse direction relative to the central axis and to lock the actuation of the switch component means disposed within said second aperture in the traverse direction relative to the central axis by the operation of switch component means disposed within said third aperture in the longitudinal direction when said switch apparatus functions as the right-hand switch.

7. The switch apparatus according to claim 5, wherein said link has a predetermined L-shape for engaging, in a second, reverse orientation, the switch component means in said third aperture and said switch component means in said second aperture.

8. The switch apparatus according to claim 1, wherein the switch component means disposed within said third aperture is designated for raising or lowering a seat adapted to be positioned within an automobile.

9. The switch apparatus according to claim 1, wherein the switch component means disposed within said first aperture is designated for reclining a seat adapted to be positioned within an automobile.

10. The switch apparatus according to claim 1, wherein the switch component means disposed within said second aperture is designated for reclining a seat adapted to be positioned within an automobile.

11. The switch apparatus according to claim 1, wherein the switch component means disposed within said fourth aperture is designated for controlling a headrest of a seat adapted to be positioned within an automobile.

12. The switch apparatus according to claim 1, wherein the switch component means disposed within said fifth aperture is designated for controlling a headrest of a seat adapted to be positioned within an automobile.

* * * * *